3,265,703
PROCESS FOR PURIFYING 3-QUINUCLIDONE
Sidney Beinfest, Berkeley Heights, Phillip Adams, Murray Hill, Benedict Juliano, Elizabeth, and John F. Marshik, Summit, N.J., assignors, by mesne assignments, to Millmaster Onyx Corporation, a corporation of New York
No Drawing. Filed July 31, 1964, Ser. No. 386,745
6 Claims. (Cl. 260—294.7)

This invention relates to improvements in purifying 3-quinuclidone contained in admixture with tarry impurities.

This application is a continuation-in-part of U.S. application, Serial No. 281,785, filed May 20, 1963, now abandoned.

3-quinuclidone having the formula:

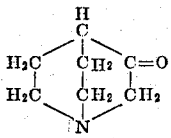

is a valuable intermediate in organic synthesis such as the preparation of pharmaceuticals. It has a melting point (M.P.) of about 150° C. and a boiling point (B.P.) of about 220° C. The preparation of 3-quinuclidone is well known, see e.g., Sternbach and Kaiser, J.A.C.S. 74, p. 2215 (1952).

The 3-quinuclidone obtained by the methods available is thus present as a whitish material in admixture with tarry impurities. The tarry impurities are present in an amount of about ½ to 1 part per part of product. These impurities present distinct impediments to the satisfactory utilization of 3-quinuclidone in subsequent reactions, and even compound the purification problems of the end products. 3-quinuclidone decomposes on distillation at atmospheric conditions and at reduced pressures and temperatures somewhat above its melting point. Additionally, its tarry impurities have similar solubility characteristics, making purification by extraction or crystallization very difficult.

This invention provides an improved process for purifying 3-quinuclidone contained in admixture with tarry impurities. The method comprises distilling the mixture in the presence of a high boiling organic diluent, and condensing the resulting distillate to obatin a fraction consisting essentially of 3-quinuclidone and diluent. The 3-quinuclidone in diluent system can be utilized as is, or the 3-quinuclidone can be separated from the diluent as explained below.

This improvement is surprising because in many cases the diluents employed form azeotropes with the 3-quinuclidone.

The organic diluents utilized are liquid at atmospheric conditions, inert and stable at the distillation conditions. They have an atmospheric boiling point in the range of about 150–300° C., preferably 190–250° C., and can be aliphatic or aromatic in nature. Chemical structure is not critical provided the diluents are inert. Examples of these materials are diisopropyl benzene, other alkyl benzenes, petroleum fractions in the indicated range, decalin, high boiling ethers, chlorinated hydrocarbons, high boiling alcohols, etc. The diluent is employed in an amount of conveniently about 1/1 to 20/1 parts by weight based on tarry mixture.

The vapor temperature of the distillation is in the range of about 90–250° C. and preferably 120–140° C. Atmospheric pressure or below can be utilized. When subatmospheric pressure is employed, it is preferably in the range of about 125 to 10 mm. Hg.

The resulting distillate on condensation consists essentially of diluent and 3-quinuclidone, i.e., the 3-quinuclidone after separation is at least 95 wt. percent pure and white in color.

The 3-quinuclidone can be recovered from the diluent, if desired, by a number of means. Since it is insoluble in most aliphatic solvents at ambient temperature, the crystallized material can be mechanically separated by filtration, etc., and finally washed with low boiling aliphatic materials, e.g., hexane, pentane, heptane, etc.

The 3-quinuclidone can be recovered from solutions in those diluents in which it is soluble at ambient temperature by water extraction, followed by azeotropic distillation with low boiling aliphatics as described to remove the water. Alternatively, the addition of acids, e.g., HCl, $H_2SO_4$, to the aromatic solution gives the insoluble acid salts which crystallize out and can be separated.

This invention and its advantages will be better understood by reference to the following examples:

Example I 3-quinuclidone as a crude tarry mixture, containing 1 part of tar to 2 parts of 3-quinuclidone, was admixed with 15 parts of diisopropyl benzene. The resultant mixture was distilled at 119–132° C. and 85–75 mm. Hg. 3-quinuclidone was thus recovered in a 95% yield contained as a solution in the diluent, and was substantially free of impurities.

Example II

Similar results as in Example I were obtained with diethyl benzene and a $C_{10}+$ aromatic fraction having a boiling point of about 182–215° C. In a similar manner, the other named diluents are employed to produce similar results.

The procedure of this invention is also applicable with suitable modification to substituted derivatives of 3-quinuclidone and related compounds.

The advantages of this invention will be apparent to those skilled in the art. An improved process for purifying 3-quinuclidone and making it available for subsequent use is provided.

It is to be understood that this invention is not limited to the specific examples which have been offered merely as illustrations, and that modifications may be made without departing from the spirit of the invention.

What is claimed is:

1. A process for purifying 3-quinuclidone contained in admixture with tarry impurities which comprises distilling it in the presence of an inert, organic diluent at a vapor temperature in the range of 90–180° C., the organic diluent having an atmospheric boiling point in the range of about 150–300° C., and condensing the resulting distillate to obtain a fraction consisting essentially of 3-quinuclidone and diluent.

2. The process of claim 1 in which the distillation is carried out at a subatmospheric pressure.

3. The process of claim 2 in which the diluent has an atmospheric boiling point in the range of 190–250° C.

4. The process of claim 3 in which the vapor distillation temperature is in the range of 120–140° C.

5. A process for purifying 3-quinuclidone contained in admixture with tarry impurities which comprises distilling it in the presence of diisopropyl benzene at subatmospheric pressure, at a vapor distillation temperature in the range of 120–140° C., and condensing the resulting distillate to obtain a fraction consisting essentially of 3-quinuclidone and diluent.

6. A process for purifying 3-quinuclidone contained in admixture with tarry impurities which comprises distilling it in the presence of diethyl benzene subatmospheric pressure, at a vapor distillation temperature in the range of 120–140° C., and condensing the resulting distillate to obtain a fraction consisting essentially of 3-quinuclidone and diluent.

No references cited.

WALTER A. MODANCE, *Primary Examiner.*

AVROM SPEVACK, *Assistant Examiner.*